(12) United States Patent
Ieda et al.

(10) Patent No.: US 7,557,316 B2
(45) Date of Patent: Jul. 7, 2009

(54) CHANGE GEAR SWITCH FOR ROD-SHAPED-HANDLE EQUIPPED VEHICLE

(75) Inventors: Yoshihisa Ieda, Saitama (JP); Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 11/708,605

(22) Filed: Feb. 21, 2007

(65) Prior Publication Data

US 2007/0199810 A1    Aug. 30, 2007

(30) Foreign Application Priority Data

Feb. 24, 2006    (JP) .............................. 2006-048008

(51) Int. Cl.
*H01H 9/06*    (2006.01)
(52) U.S. Cl. ................................ 200/61.88; 200/61.85
(58) Field of Classification Search .................. 200/18, 200/329, 339, 553, 561–563, 61.27, 61.54, 200/61.57, 61.85, 61.87, 61.88
See application file for complete search history.

(56) References Cited

U.S. PATENT DOCUMENTS

| | | | | |
|---|---|---|---|---|
| 3,431,374 A | * | 3/1969 | Raab ....................... | 200/61.54 |
| 3,894,442 A | * | 7/1975 | Hembree ................... | 74/335 |
| 4,191,866 A | * | 3/1980 | Nakajima et al. .......... | 200/4 |
| 4,641,723 A | * | 2/1987 | Takanashi et al. ........... | 180/315 |
| 4,710,599 A | * | 12/1987 | Motodate et al. ........... | 200/61.85 |
| 4,847,454 A | * | 7/1989 | Hiruma ..................... | 200/61.85 |
| 6,407,663 B1 | * | 6/2002 | Huggett ..................... | 340/461 |
| 6,750,411 B2 | * | 6/2004 | Janisch ..................... | 200/61.85 |
| 7,402,767 B2 | * | 7/2008 | Tozuka et al. ............. | 200/61.54 |

FOREIGN PATENT DOCUMENTS

JP    2003-341376 A    12/2003

* cited by examiner

*Primary Examiner*—Michael A Friedhofer
*Assistant Examiner*—Lisa N Klaus
(74) *Attorney, Agent, or Firm*—Birch, Stewart, Kolasch & Birch, LLP

(57) ABSTRACT

A change gear switch of a rod-shape handle bar equipped vehicle which allows a ride to easily manipulate a switch manipulation portion while grasping a grip portion and, at the same time, prevents a hand of a rides or a glove from interfering with a switch manipulation portion. Switch manipulation portion for the transmission manipulation are mounted on switch boxes which are arranged adjacent to grip portions of the handle. Manipulation face of the switch manipulation portions are arranged at position which are further toward an inside of the handle bar than where the grip portion are located. One of the manipulation faces is mounted further toward a front side of the vehicle than where the grip portion are located, and another manipulation face is mounted further toward a lower side than where the grip portions are located.

23 Claims, 5 Drawing Sheets

CHANGE GEAR SWITCH FOR ROD-SHAPED-HANDLE EQUIPPED VEHICLE

CROSS-REFERENCE TO RELATED APPLICATION

The present application claims priority under 35 U.S.C. §119 to Japanese Patent Application No. 2006-048008, filed Feb. 24, 2006, the entire contents of which are hereby incorporated by reference.

BACKGROUND OF THE INVENTION

1. Field of the Invention

The present invention relates to a change gear switch of a transmission device which is applied to a vehicle equipped with a rod-shaped-handle such as a motorcycle or a buggy car.

2. Description of Background Art

Recently, as an automatic transmission device of a motorcycle, there has been proposed an automatic transmission device which can arbitrary perform a shift-up manipulation or a shift-down manipulation by a manual operation.

A change gear switch of the transmission device for shift manipulation is configured such that a switch manipulation portion extends toward a lower position of a grip portion or toward a front position of a vehicle from a switch box, and a rider can manipulate a switch manipulation portion with a finger tip while grasping the grip portion. (See for example, JP-A-2003-341376.)

However, in such a conventional change gear switch, since the switch manipulation portion extends toward the lower position of the grip portion or toward the front position of the vehicle from the switch box, when a size of hand of the rider is large or when the rider wears thick winter cold protection gloves on his hands, the hand or the glove easily interferes with the switch manipulation portion.

SUMMARY AND OBJECTS OF THE INVENTION

Accordingly, it is an object of the present invention to provide a change gear switch of a rod-shaped-handle equipped vehicle in which a driver can easily manipulate a switch manipulation portion while grasping a grip portion and, at the same time, can prevent a hand of a rider or gloves from interfering with the switch manipulation portion.

As means for overcoming the above-mentioned drawbacks, according to a first aspect of the present invention, a change gear switch of a rod-shaped-handle equipped vehicle is provided. A grip portion to be grasped by a rider (a grip portion 2 in an embodiment described later, for example) is mounted on an end portion of a rod-shaped handle (a handle bar 1 in the embodiment described later, for example). A switch box (a switch box 4 described in the embodiment described later, for example) is arranged adjacent to a proximal portion side of the grip portion, and a switch manipulation portion (switch manipulation portions 8A, 8B in the embodiment described later, for example) for transmission manipulation is mounted on the switch box.

A manipulation face (a manipulation face 9 of the embodiment described later, for example) of the switch manipulation portion is arranged at a position more inside the rod-shaped handle than the grip portion and, at the same time, at a position closer to a front portion of the vehicle body than the grip portion and at a position lower than the grip portion.

According to the present invention, when a rider grasps the grip portion normally, there is no switch manipulation portion around the grip portion and hence, a hand of the rider or a glove does not interfere with the switch manipulation portion. At the time of performing a transmission operation, the rider performs the transmission manipulation such that the rider extends his finger tip to a manipulation surface of the switch manipulation portion inside the rod-shaped-handle while grasping of the grip portion or slightly shifting the grasping position of the grip portion to the proximal portion side of the grip portion.

According to a second aspect of the invention, in the change gear switch of the rod-shaped-handle equipped vehicle, the manipulating direction of the switch manipulation portion whose manipulation face is arranged closer to a front side of the vehicle than the grip portion is set in the downward direction, and the manipulating direction of the switch manipulation portion whose manipulation face is arranged lower than the grip portion is set in the direction toward the front side of the vehicle.

Due to such a constitution, when the rider who grasps the grip portion engages his index finger or middle finger with the switch manipulation portion on the vehicle-body front side and engages his thumb with the switch manipulation portion at the lower portion of the vehicle, the switch manipulation directions of the respective fingers are aligned with the grasping direction with respect to the grip portion.

According to the first aspect of the present invention, the rider who grasps the grip portion can directly perform the transmission manipulation by extending his finger tip to manipulation face of the switch manipulation portion inside the rod-shaped handle. Further, since the manipulation face of the switch manipulation portion is not arranged around the grip portion, in the normal grasping operation of the rider, it is possible to preliminarily prevent the rider's hand or the glove from interfering with the switch manipulation portion. Accordingly, according to the invention, it is possible to further enhance the switch manipulation property.

According to the second aspect of the present invention, the operation direction of each finger of the rider which is engaged with the respective switch manipulation portion agrees with the grasping direction of the grip portion and hence, the rider can perform the switch manipulation with the natural operation of the finger tip while grasping the grip portion at the time of performing the gear change manipulation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
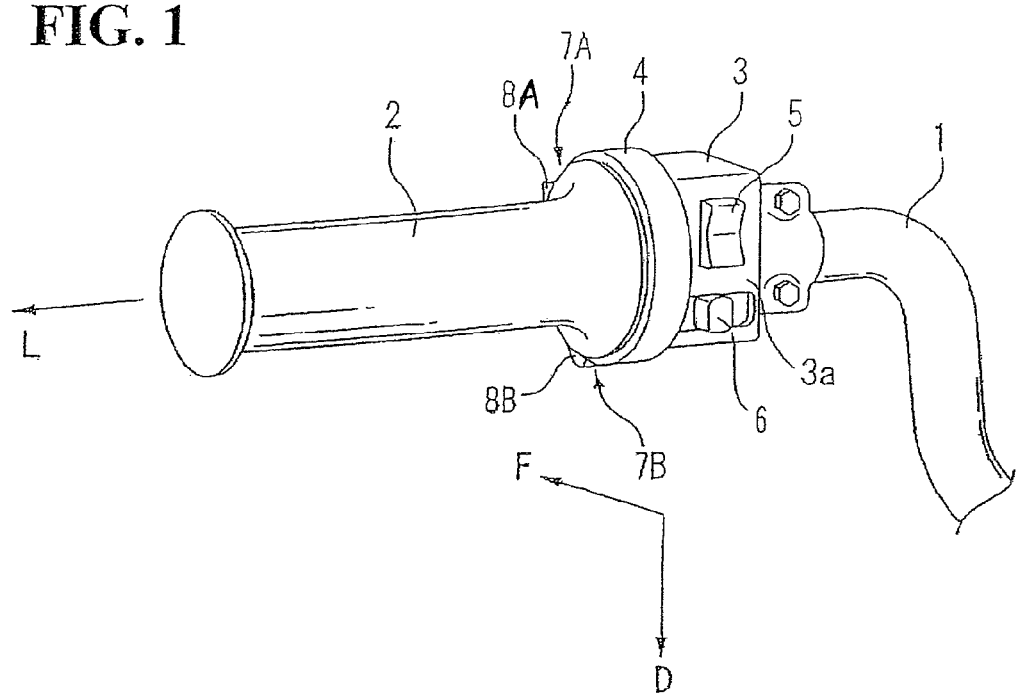
FIG. 1 is a perspective view of a rod-shaped-handle as viewed from an upper rear side of a vehicle body showing a first embodiment of the invention.

Hereinafter, respective embodiments of the invention. In the following explanation, "front", "back", "left" and "right" mean the front, back, left and right side with respect to the advancing direction of a vehicle unless otherwise specified. Further, arrows F, D and L in the drawings respectively indicate a front side, a down side and a left side of the vehicle.

Figure 2:
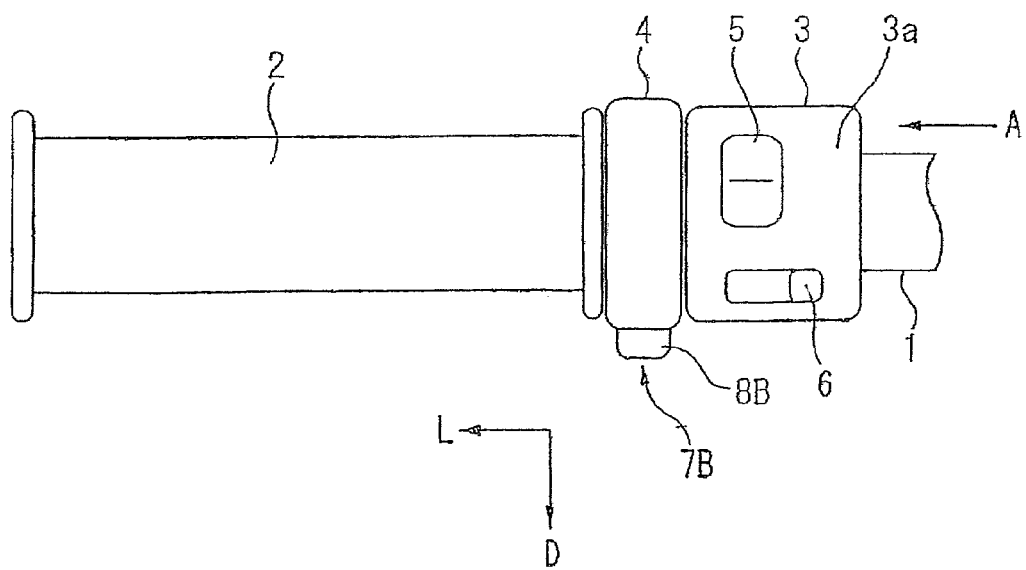
FIG. 2 is a front view corresponding to a view as viewed in an arrow B direction in FIG. 3 showing the embodiment.
Figure 3:
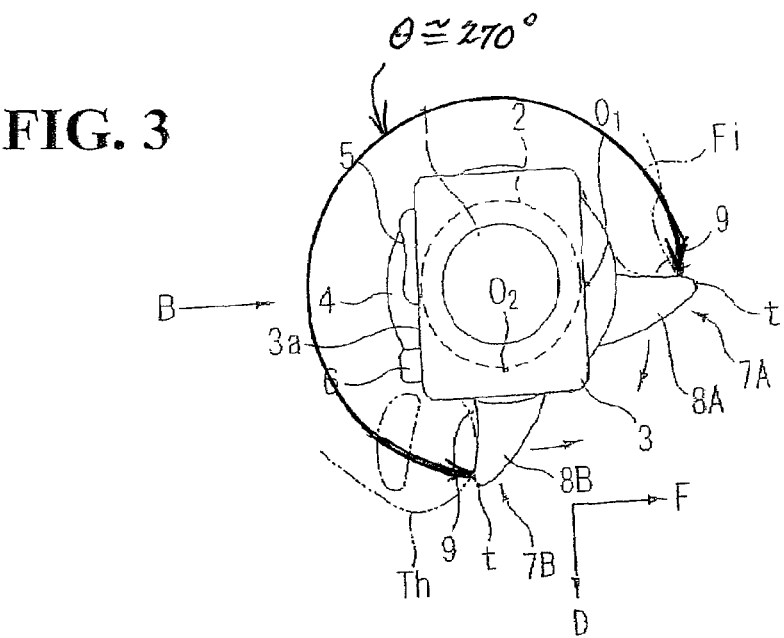
FIG. 3 is a side view corresponding to a view as viewed in an arrow A direction in FIG. 2 showing the embodiment.

First of all, a first embodiment shown in FIG. 1 to FIG. 3 is explained.

A rod-shaped-handle equipped vehicle of this embodiment is a motorcycle, and the motorcycle uses an automatic transmission (not shown in the drawings) as a transmission for transmitting an engine power by changing gears. The automatic transmission can automatically perform gear changes in response to various traveling conditions and, at the same time, can arbitrarily perform an up-shift operation and a down-shift operation by a switching operation of a rider.

The drawings show a handle bar 1 (a rod-shaped handle) which extends in the drawing in the left and right directions from a steering center of a vehicle not shown the drawing, and grip portions 2 to be grasped by a rider during driving are mounted on both end portions of the handle bar 1. Two tandem switch boxes 3, 4 on which various kinds of switches are mounted are arranged close to each other on proximal portion sides of the grip portion 2. The first switch box 3 which is arranged on a side spaced-apart from the grip portion 2 is formed in an approximately rectangular parallelepiped shape, while the second switch box 4 which is arranged on a side adjacent to the grip portion 2 is formed in a disc shape having large thickness. These switch boxes 3 and 4 are attached to a shaft portion of the handle bar 1 such that the switch boxes 3 and 4 wrap around an outer peripheral surface of the handle bar 1, and the second switch box 4 is configured to have a diameter larger than a diameter of the grip portion 2.

A dimmer switch 5 for adjusting a headlight and a blinker switch 6 are mounted on a vehicle-body-rear-side surface 3a of the first switch box 3, and change gear switches 7A, 7B for down-shifting and up-shifting of the transmission device are mounted on a vehicle-body-front side region and a vehicle-body-down side region of the second switch box 4 respectively. The respective change gear switches 7A, 7B are provided with switch manipulation portions 8A, 8B having an approximately triangular shape which are independent from each other, and the respective switch manipulation portions 8A, 8B are tiltably supported in the inside of the switch box 4.

The switch manipulation portion SA on the down-shifting side has a triangular top portion thereof straightly projected toward the front side of the vehicle from the vehicle-body-front side region of the switch box 4. In the same manner, the switch manipulation portion 8B on the up-shifting side has a triangular top portion thereof straightly projected toward the lower side of the vehicle body from the vehicle-body-down side region of the switch box 4. Further, in the switch manipulation portion 8A on the down-shifting side, a triangular top portion which projects toward the front side of the vehicle body and an upper portion which is arranged adjacent to the top portion mainly constitute a manipulation face 9. In the same manner, in the switch manipulation portion 8B on the up-shifting side, a triangular top portion which projects to the vehicle-body-lower side and a rear side portion which is arranged adjacent to the top portion mainly constitute a manipulation face 9. Accordingly, the manipulation faces 9 of the respective switch manipulation portions 8A, 8B are arranged at positions which are arranged more inside the handle bar 1 than the grip portion 2 and, at the same time, at a position closer to the front side of the vehicle than the grip portion 2 and at a position lower than the grip portion 2. As can be seen in FIG. 3, surfaces of the first and second manipulation faces 9, 9 are substantially planar in shape, and the planar surfaces extend substantially parallel to an axis of the grip portion. Further, second switch box 4 is substantially parallelopiped in shape, and the first manipulation face 9 is substantially parallel to an upper facing surface of second switch box 4, and the second manipulation face 9 is substantially parallel to a rearward facing surface of second switch box 4. Moreover, an angle θ between the first manipulation face and the second manipulation face is substantially equal to 270°.

Here, the switch manipulation portion 8A on the down-shifting side outputs a down-shift-output to a controller in response to the downward switch manipulation, while the switch manipulation portion 8B on the up-shifting side outputs an up-shift-output to a controller in response to the switch manipulation toward the front side of the vehicle body. Here, respective change gear switches 7A, 7B incorporate return springs therein, and the return springs are automatically returned to initial positions by releasing operations of the respective switch manipulation portions 8A, 8B.

When the rider grasps the grip portions 2 in driving the motorcycle, hands of the rider who grasps the grip portions 2 normally are positioned on left sides of the second switch boxes 4. Here, since the switch manipulation portions 8A, 8B of the change gear switches 7A, 7B are not positioned around the grip portions 2 and the hands of the rider who grasps the grip portions 2, when the rider performs the grasping operation of the grip portions 2, the hands of the rider or the gloves no more interfere with the switch manipulation portions 8A, 8B.

Further, when the rider manipulates the change gear switches 7A, 7B, the rider grasps the grip portion 2 and, while holding the grasping operation, slightly shifts the grasping position in the direction toward the inside of the handle bar 1 and, thereafter, extends the finger tip in the direction toward the switch box 3 (in the inward direction to the handle bar 1), and engages the finger tip with the corresponding switch manipulation portion 8A (or 8B) so as to manipulate the switch manipulation portion 8A (or 8B) in the predetermined position. To be more specific, as shown in FIG. 3, the rider engages his index finger Fi or the middle finger with the switch manipulation portion 8A on the down-shift side from above, and the rider engages his thumb Th with the switch manipulation portion 8B on the up-shift side from below. That is, the switch manipulation portion 8A is pushed down downwardly by the index finger Fi or the middle finger at the time of down-shift operation, while the switch manipulation portion 8B is pushed in frontwardly by the thumb Th at the time of up-shift operation.

With these change gear switches 7A, 7B, the up-shift operation and the down-shift operation can be performed by the manipulation of the finger tips while grasping the grip portions 2 with hands, and there is no possibility that the hands or gloves touch the switch manipulation portions 8A, 8B at the time of performing usual grasping operation of the grip portion 2 and hence, the manipulability of the rider can be largely enhanced.

Further, in case of these change gear switches 7A, 7B, the manipulation direction of the switch manipulation portion 8A which is manipulated with the index finger Fi or the middle finger is directed downwardly, and the manipulation direction of the switch manipulation portion 8B which is manipulated with the thumb Th is directed toward the front side of the vehicle and hence, the rider can easily perform the switch manipulation in the natural motion of the finger from a state that the rider grasps the grip portion 2.

Hereinafter, other embodiments of the invention are explained, wherein parts identical with the parts shown in the first embodiment are given the same symbols and the explanation of the overlapped portions is omitted. The respective embodiments described hereinafter differ from each other only with respect to the structure of the manipulation switch and are substantially equal with respect to remaining parts.

Figure 4:
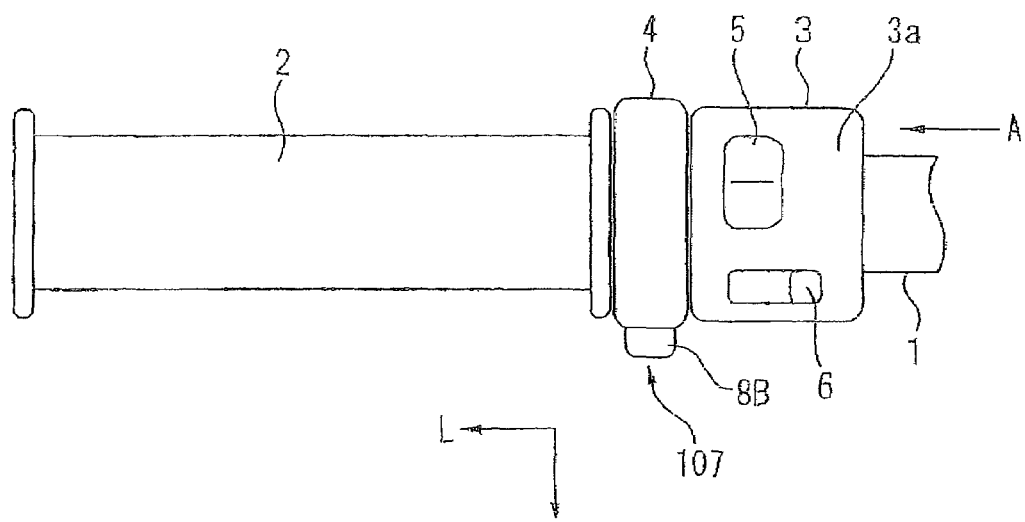
FIG. 4 is a front view corresponding to a view as viewed in an arrow B direction in FIG. 5 showing a second embodiment of the invention.
Figure 5:
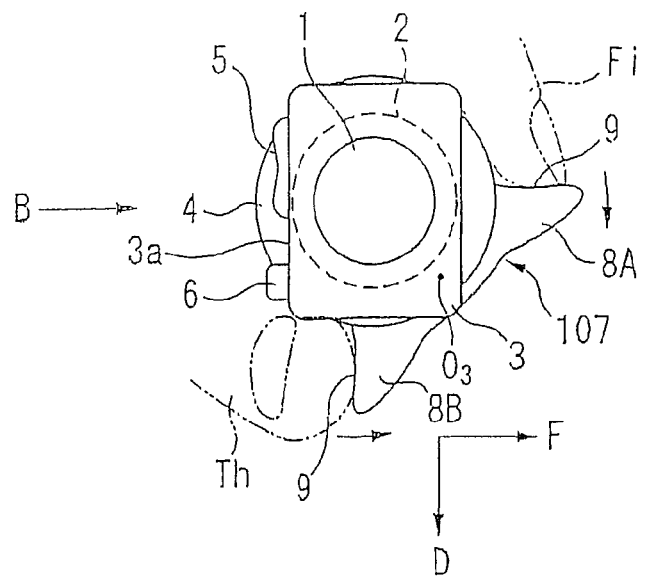
FIG. 5 is a side view corresponding to a view as viewed in an arrow A direction in FIG. 4 showing the embodiment.

A change gear switch 107 of the second embodiment shown in FIG. 4 and FIG. 5 is configured to be able to perform the up-shift operation and the down-shift operation using a single switch part which is rotatably arranged in the inside of a switch box 4. To be more specific, while the switch manipulation portions 8A, 8B in the first embodiment are respectively constituted of two parts which have rotational pivotal points O1, O2 individually, in case of the transmission of the second embodiment, two switch manipulation portions 8A, 8B and one rotational pivotal point O3 are provided to one switch part.

Also in this change gear switch 107, the switch manipulation portions 8A, 8B are respectively provided to a vehicle-body-front side and a vehicle-body-lower side of the grip portion 2, and the up-shift manipulation of the switch manipulation portion 8A is performed with an index finger Fi or a middle finger of a rider at the time of performing the up-shift operation, and the push-down manipulation of the switch manipulation portion 8B toward the front side of the vehicle body is performed with a thumb Th of the rider at the time of performing the down-shift operation.

Although this embodiment also can basically obtain the same advantageous effects as advantageous effects of the first embodiment, the switch manipulation portions 8A, 8B of the change gear switch 107 are formed in one switch part and hence, it is possible to reduce a manufacturing cost due to the reduction of the number of parts.

Figure 6:
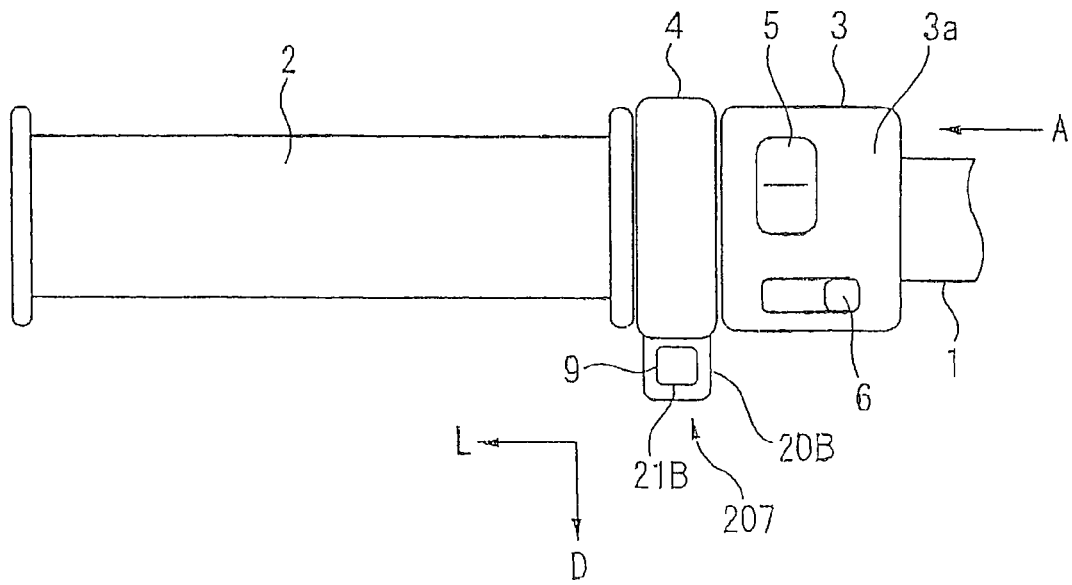
FIG. 6 is a front view corresponding to a view as viewed in an arrow B direction in FIG. 7 showing a third embodiment of the invention.
Figure 7:
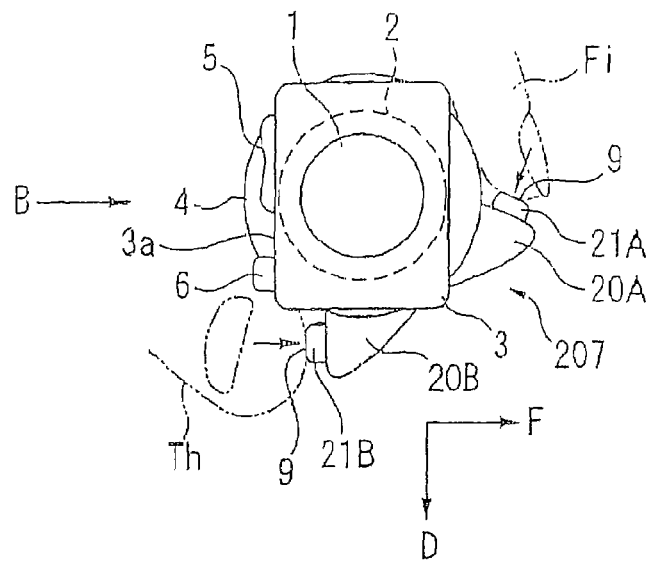
FIG. 7 is a side view corresponding to a view as viewed in an arrow A direction in FIG. 6 showing the embodiment.

A change gear switch 207 of the third embodiment shown in FIG. 6 and FIG. 7 is configured such that arm portions 20A, 20B which extend toward a front side and a lower side of a vehicle body are mounted on the switch box 4, and the switch manipulation portion is constituted of push buttons 21A, 21B which are mounted on respective arm portions 20A, 20B. Also in this embodiment, the manipulation direction of the push button 21A on the vehicle-body-front side is directed downwardly and the manipulation direction of the push button 21B on the downward side is directed to a front side of the vehicle body.

Figure 8:
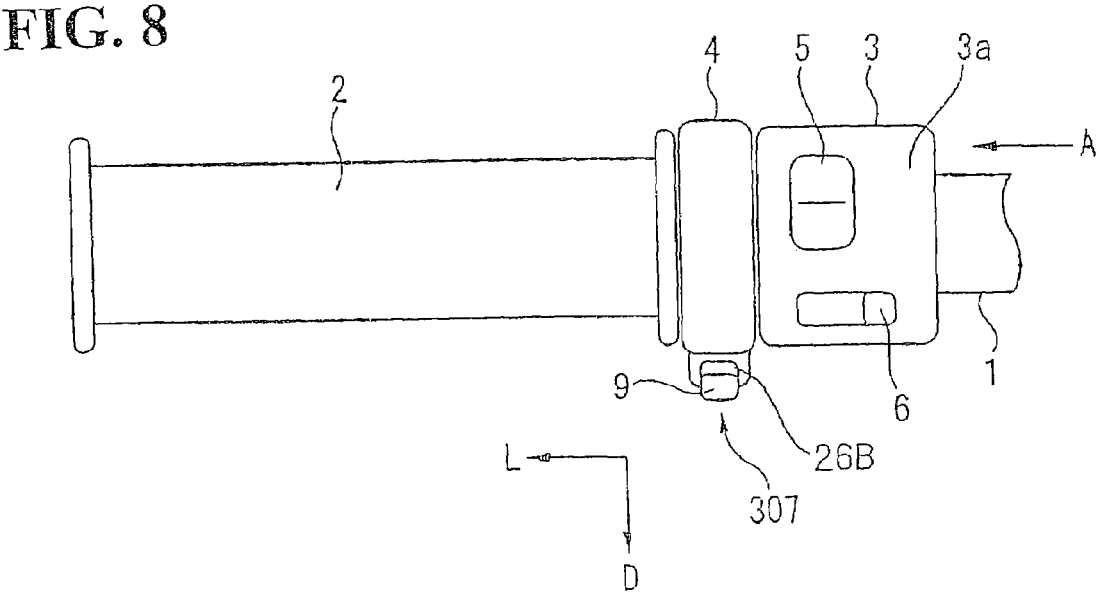
FIG. 8 is a front view corresponding to a view as viewed in an arrow B direction in FIG. 9 showing a fourth embodiment of the invention.
Figure 9:
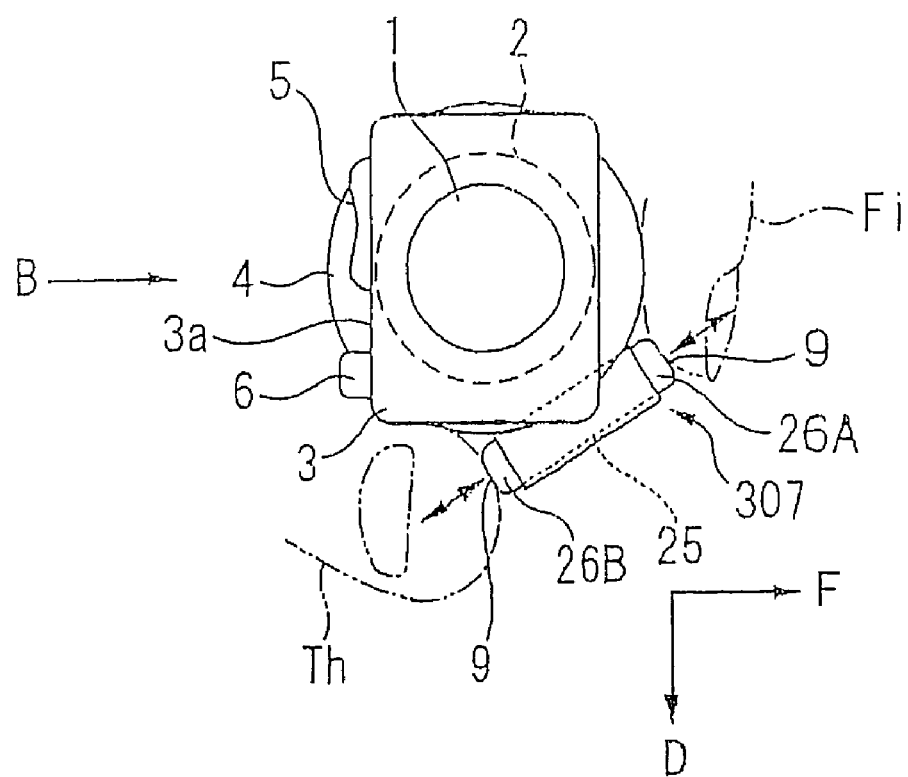
FIG. 9 is a side view corresponding to a view as viewed in an arrow A direction in FIG. 8 showing the embodiment.

In a change gear switch 307 of the fourth embodiment shown in FIG. 8 and FIG. 9, a switch box 4 is provided such that a rod-shaped button 25 which can be manipulated in a reciprocal manner is directed obliquely in the frontward and upward direction of the vehicle body as well as obliquely in the backward direction of the vehicle body, wherein a switch manipulation portion is constituted of both end portions 26A, 26B of the rod-shaped button 25. In this case, the manipulation direction of the rod-shaped button 25 from the front side of the grip portion 2 is directed substantially in the downward direction, and the manipulation direction of the rod-shaped button 25 from the lower side of the grip portion 2 is directed substantially in the direction toward the front side of the vehicle body.

Here, the invention is not limited to the above-mentioned respective embodiments and various modifications are conceivable without departing from the gist of the invention. For example, in the above-mentioned embodiment, the change gear switch according to the invention is applied to the handle bar of the motorcycle. However, a vehicle to which the change gear switch according to the invention is applicable may be, provided that the vehicle is a vehicle which has a rod-shaped handle, a four-wheeled vehicle such as a buggy.

Such variations are not to be regarded as a departure from the spirit and scope of the invention, and all such modifications as would be obvious to one skilled in the art are intended to be included within the scope of the following claims.

What is claimed is:

1. A change gear switch of a rod-shaped-handle equipped vehicle in which a grip portion to be grasped by a rider is mounted on an end portion of a rod-shaped handle, comprising:
   a switch box arranged adjacent to a proximal portion side of the grip portion; and
   a switch manipulation portion for transmission manipulation mounted on the switch box,
   wherein first and second manipulation faces of the switch manipulation portion are arranged at positions further toward an inside of the rod-shaped handle than where the grip portion is arranged, and
   wherein the first manipulation face is arranged at a position closer to a front portion of the vehicle body than where the grip portion is portion is arranged, and the second manipulation face is arranged at a position lower than where the grip portion is arranged, and
   wherein the first manipulation face and the second manipulation face are arranged so as either to be substantially orthogonal to each other, or to be substantially parallel to each other.

2. The change gear switch of a rod-shaped handle equipped vehicle according to claim 1,
   wherein a manipulating direction of the switch manipulation portion including the first manipulation face is set in a downward direction, and
   wherein a manipulating direction of the switch manipulation portion including the second manipulation face is set in a direction toward a front side of the vehicle.

3. The change gear switch of a rod-shaped handle equipped vehicle according to claim 1, wherein each of the first and second manipulation faces is a triangular shaped portion of the switch manipulation portion.

4. The change gear switch of a rod-shaped handle equipped vehicle according to claim 1, wherein the first and second manipulation faces are faces of a pair of push buttons of the switch manipulation portion.

5. The change gear switch of a rod-shaped handle equipped vehicle according to claim 1, wherein the first and second manipulation faces are opposite faces of a rod-shaped button of the switch manipulation portion.

6. The change gear switch of a rod-shaped handle equipped vehicle according to claim 1, wherein the switch manipulation portion includes a pair of switch manipulation portions which have individual rotational pivotal points.

7. The change gear switch of a rod-shaped handle equipped vehicle according to claim 1, wherein the switch manipulation portion includes a pair of switch manipulation portions having a common rotational pivotal point.

8. The change gear switch of a rod-shaped handle equipped vehicle according to claim 1, wherein the switch manipulation portion is non-pivotable.

9. The change gear switch of a rod-shaped handle equipped vehicle according to claim 1, wherein the switch box includes a first switch box and a second switch box, each of which wraps around an outer peripheral surface of the rod-shaped handle.

10. The change gear switch of a rod-shaped handle equipped vehicle according to claim 1, wherein the switch box arranged adjacent to the proximal side portion of the grip portion includes a rectangular, parallelopiped-shaped switch box, and a disc-shaped box.

11. A change gear switch of a rod-shaped-handle equipped vehicle in which a grip portion to be grasped by a rider is mounted on an end portion of a rod-shaped handle, comprising:
   a switch box arranged adjacent to a proximal portion side of the grip portion; and
   first and second switch manipulation portions for transmission manipulation mounted on the switch box, the first switch manipulation portion including a first manipulation face, and the second switch manipulation portion including a second manipulation face,
   wherein the first and second switch manipulation portions are arranged at positions further toward an inside of the rod-shaped handle than where the grip portion is arranged, and
   wherein the first manipulation face of the first manipulation portion is arranged at a position closer to a front portion of the vehicle body than where the grip portion is located, and the second manipulation face of the second manipulation portion is arranged at a position lower than where the grip portion is located, and
   wherein the first manipulation face and the second manipulation face are arranged so as either to be substantially orthogonal to each other, or to be substantially parallel to each other.

12. The change gear switch of a rod-shaped handle equipped vehicle according to claim 11,
   wherein a manipulating direction of the first manipulation face is set in a downward direction, and
   wherein a manipulating direction of the second manipulation face set in a direction toward a front side of the vehicle.

13. The change gear switch of a rod-shaped handle equipped vehicle according to claim 11, wherein the first and second manipulation faces are triangular shaped portions of the first and second switch manipulation portions.

14. The change gear switch of a rod-shaped handle equipped vehicle according to claim 11, wherein the first and second manipulation faces are faces of a pair of push buttons of the first and second switch manipulation portions.

15. The change gear switch of a rod-shaped handle equipped vehicle according to claim 11, wherein the first and second manipulation faces are opposite faces of a rod-shaped button constituting the first and second switch manipulation portions.

16. The change gear switch of a rod-shaped handle equipped vehicle according to claim 11, wherein the first and second switch manipulation portions have individual rotational pivotal points.

17. The change gear switch of a rod-shaped handle equipped vehicle according to claim 11, wherein the first and second switch manipulation portions have a common rotational pivotal point.

18. The change gear switch of a rod-shaped handle equipped vehicle according to claim 11, wherein the first and second switch manipulation portions are non-pivotable.

19. The change gear switch of a rod-shaped handle equipped vehicle according to claim 11, wherein the switch box includes a first switch box and a second switch box, each of which wraps around an outer peripheral surface of the rod-shaped handle.

20. The change gear switch of a rod-shaped handle equipped vehicle according to claim 11, wherein the switch box arranged adjacent to the proximal side portion of the grip portion includes a rectangular, parallelopiped-shaped switch box, and a disc-shaped box.

21. The change gear switch of a rod-shaped handle equipped vehicle according to claim 1, wherein surfaces of the first and second manipulation faces are substantially planar in shape, the planar surfaces extending substantially parallel to an axis of the grip portion.

22. The change gear switch of a rod-shaped handle equipped vehicle according to claim 1, wherein switch box being parallelopiped in shape, and
   wherein the first manipulation face is substantially parallel to an upper facing surface of the parallelopiped-shaped switch box, and the second manipulation face is substantially parallel to a rearward facing surface of the parallelopiped-shaped switch box.

23. The change gear switch of a rod-shaped handle equipped vehicle according to claim 1, wherein an angle $\theta$ between the first manipulation face and the second manipulation face is substantially equal to 270°.

* * * * *